(12) United States Patent   (10) Patent No.: US 8,792,124 B2
Sugawara   (45) Date of Patent: Jul. 29, 2014

(54) PRINT CONTROL APPARATUS, IMAGE FORMING SYSTEM, AND NON-TRANSITORY COMPUTER READABLE MEDIUM

(71) Applicant: Fuji Xerox Co., Ltd., Tokyo (JP)

(72) Inventor: Masafumi Sugawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/942,229

(22) Filed: Jul. 15, 2013

(65) Prior Publication Data

US 2014/0104642 A1   Apr. 17, 2014

(30) Foreign Application Priority Data

Oct. 11, 2012   (JP) .................................. 2012-225929

(51) Int. Cl.
G06K 15/00   (2006.01)
(52) U.S. Cl.
USPC ......... 358/1.15; 358/1.13; 358/1.9; 358/1.12; 358/1.6
(58) Field of Classification Search
None
See application file for complete search history.

(56) References Cited

U.S. PATENT DOCUMENTS

| | | | | |
|---|---|---|---|---|
| 6,727,999 B1 * | 4/2004 | Takahashi | | 358/1.15 |
| 6,825,943 B1 * | 11/2004 | Barry et al. | | 358/1.15 |
| 6,850,335 B1 * | 2/2005 | Barry et al. | | 358/1.15 |
| 6,934,047 B2 * | 8/2005 | Housel | | 358/1.15 |
| 7,027,187 B1 * | 4/2006 | Zuber | | 358/1.9 |
| 7,099,027 B1 * | 8/2006 | Barry et al. | | 358/1.15 |
| 7,161,705 B2 * | 1/2007 | Klassen | | 358/1.18 |
| 7,352,481 B2 * | 4/2008 | Christiansen | | 358/1.13 |
| 7,576,874 B2 * | 8/2009 | Farrell et al. | | 358/1.13 |
| 7,847,967 B2 * | 12/2010 | Ferlitsch | | 358/1.16 |
| 8,264,726 B2 * | 9/2012 | Klassen et al. | | 358/1.16 |
| 8,325,372 B2 * | 12/2012 | Klassen | | 358/1.15 |
| 2008/0007754 A1 | 1/2008 | Torii | | |
| 2009/0153892 A1 | 6/2009 | Torii | | |

FOREIGN PATENT DOCUMENTS

| | | |
|---|---|---|
| JP | 2000-137591 A | 5/2000 |
| JP | 2005-153426 A | 6/2005 |
| JP | 2006-39719 A | 2/2006 |
| JP | 2008-15605 A | 1/2008 |
| JP | 2009-146251 A | 7/2009 |
| JP | 2013-52568 A | 3/2013 |

* cited by examiner

Primary Examiner — Ashish K Thomas
(74) Attorney, Agent, or Firm — Sughrue Mion, PLLC

(57) ABSTRACT

A print control apparatus includes the following components. Drawing processing units each perform a drawing process. A sending unit sends the entire print instruction including multiple pages and written in a page description language, to the drawing processing units. The delivering unit delivers each processing request which specifies one of the multiple pages, to a corresponding one of the drawing processing units. When performing, to perform a drawing process in which a print instruction for a page specified by a processing request is converted into print data, an analysis process on the print instruction from the first page to the specified page, each drawing processing unit refers to an identifier in the page description language of the print instruction for pages other than the specified page, and does not perform the analysis process for a range not containing a command that influences a drawing process of other pages.

7 Claims, 16 Drawing Sheets

FIG. 7

```
cs
<<
/ImageType 1
/Width 400
/Height 400
/ImageMatrix [
/BitsPerComponent 8
/Decode [
/DataSource
```
} HEADER PART OF IMAGE DATA

BODY OF IMAGE DATA

/FlateDecode filter
>>
image

FIG. 8

(CODE INDICATING START OF IMAGE DATA) ~81

```
cs
<<
/ImageType 1
/Width 400
/Height 400
/ImageMatrix [
/BitsPerComponent 8
/Decode [
/DataSource
```
HEADER PART OF IMAGE DATA

BODY OF IMAGE DATA

/FlateDecode filter
>>
image
(CODE INDICATING END OF IMAGE DATA) ~82

FIG. 9A DATA OF PAGE 1
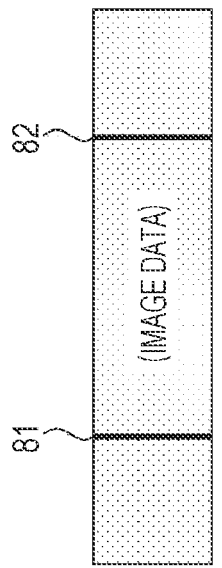
FIG. 9B
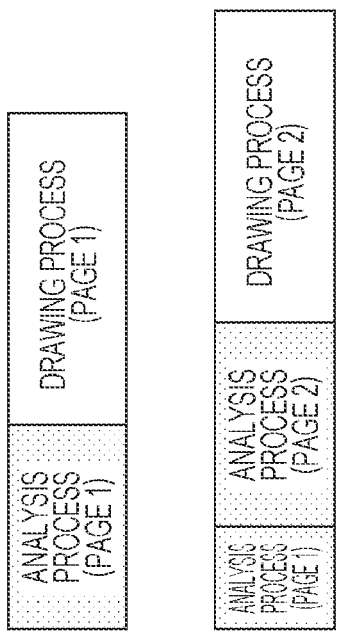
RIP PROCESSING UNIT 51Y
RIP PROCESSING UNIT 51M
RIP PROCESSING UNIT 51C
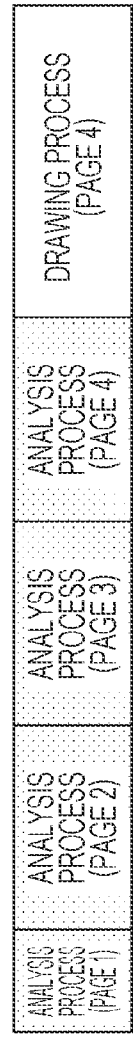
RIP PROCESSING UNIT 51K

FIG. 16

```
%!PS-Adobe-3.0
%%Title: (sample.pdf)
%%Version: 14
%%Creator: PDFL 7.0
%%CreationDate: 16:46:08 03/08/11
%%DocumentData: Binary
%%LanguageLevel: 3
    .
    .
    .

%%Page: 1 1
```

CONTENT OF PAGE 1

```
%%Page: 2 2
```

CONTENT OF PAGE 2

PRINT CONTROL APPARATUS, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-225929 filed Oct. 11, 2012.

BACKGROUND

Technical Field

The present invention relates to a print control apparatus, an image forming system, and a non-transitory computer readable medium.

SUMMARY

According to an aspect of the invention, there is provided a print control apparatus including multiple drawing processing units, a sending unit, and a delivering unit. The multiple drawing processing units perform a drawing process on a print instruction written in a page description language. The sending unit sends the entirety of a print instruction including plural pages, to the multiple drawing processing units. The delivering unit delivers each of processing requests to a corresponding one of the multiple drawing processing units. Each of the processing requests specifies which page of the print instruction is to be subjected to a drawing process. When each of the multiple drawing processing units performs, in order to perform a drawing process in which a print instruction for a page specified by a processing request delivered by the delivering unit is converted into print data, an analysis process on the print instruction from the first page of the print instruction to the specified page, the drawing processing unit refers to an identifier in the page description language of the print instruction for pages other than the page specified by the processing request delivered by the delivering unit, and does not perform the analysis process for a range not containing a command that influences a drawing process of other pages.

BRIEF DESCRIPTION OF THE DRAWINGS

Exemplary embodiments of the present invention will be described in detail based on the following figures, wherein:

FIG. 7 illustrates an example of a page description language before skip IDs are inserted;

FIG. 8 illustrates an example of the page description language after skip IDs are inserted;

FIGS. 9A and 9B illustrate a relationship between an analysis process and a drawing process performed in the RIP processing units in the case where data of page 1 contains image data;

FIG. 16 illustrates an example of DSC comments.

DETAILED DESCRIPTION

Exemplary embodiments of the present invention will now be described in detail with reference to the accompanying drawings.

First Exemplary Embodiment

Figure 1:
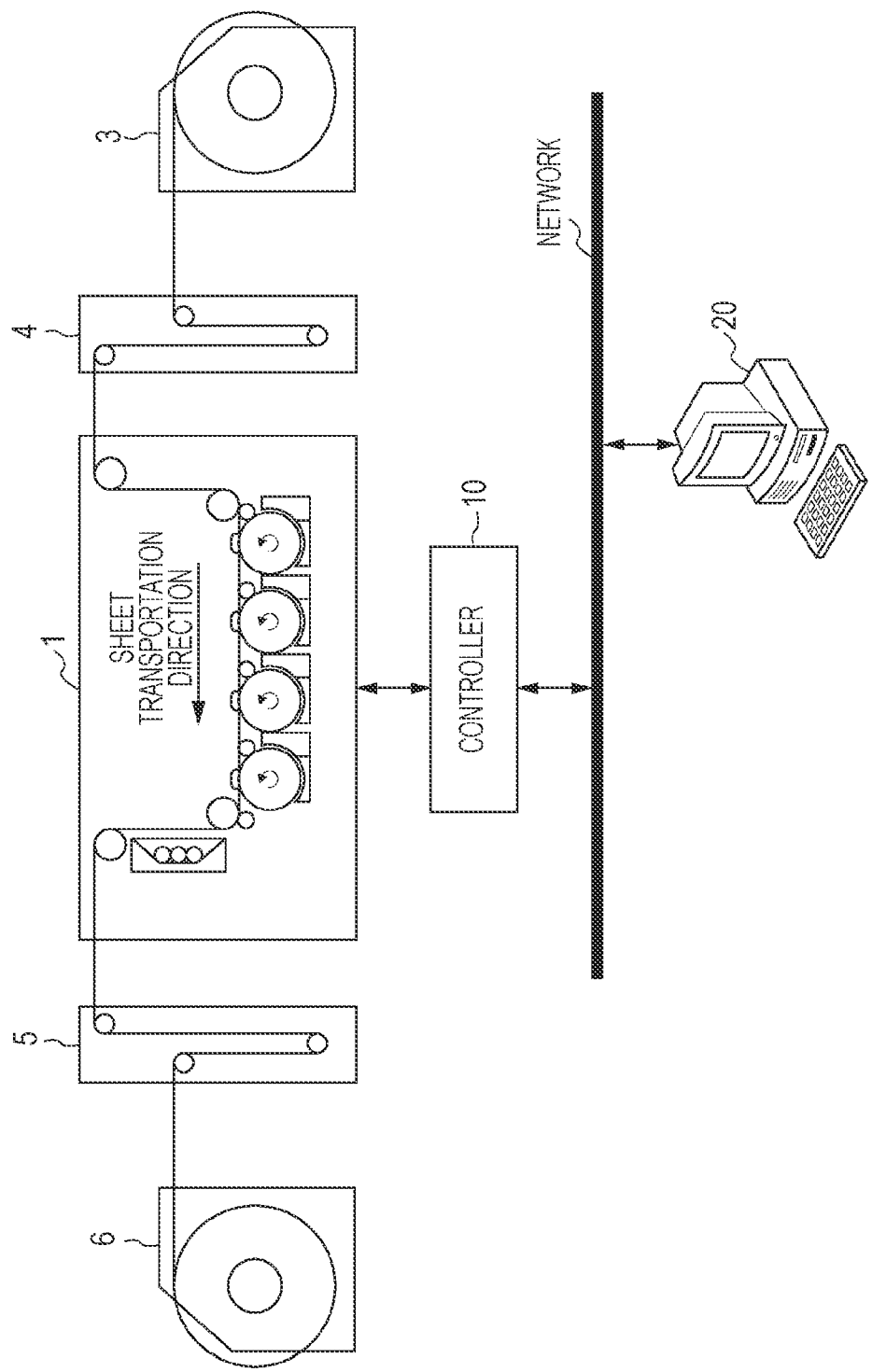
FIG. 1 illustrates the configuration of a printing system according to a first exemplary embodiment of the present invention.

Now, a printing system (corresponding to an image forming system) according to a first exemplary embodiment of the present invention will be described. FIG. 1 illustrates an example of the configuration of the printing system according to the first exemplary embodiment of the present invention. As illustrated in FIG. 1, this printing system includes a pre-processing apparatus 3, a buffering apparatus 4, a printing apparatus 1 (corresponding to an image output apparatus) which performs printing on a continuous sheet, a buffering apparatus 5, a post-processing apparatus 6, a controller (corresponding to a print control apparatus) 10, and a terminal apparatus 20.

The pre-processing apparatus 3 performs pre-processing, such as feeding a print sheet on which printing is to be performed. The post-processing apparatus 6 performs post-processing, such as rolling the print sheet on which printing has been performed. The buffering apparatuses 4 and 5 are respectively provided between the pre-processing apparatus 3 and the printing apparatus 1 and between the printing apparatus 1 and the post-processing apparatus 6 to keep the print sheet tense and so forth.

The terminal apparatus 20 generates a print instruction, such as a print job, and sends the generated print instruction to the controller 10 via a network. The controller 10 functions as a print control apparatus that controls a printing operation performed by the printing apparatus 1 in accordance with the print instruction sent from the terminal apparatus 20. Under control of the controller 10, the printing apparatus 1 outputs an image based on the print instruction on the continuous sheet.

Figure 2:
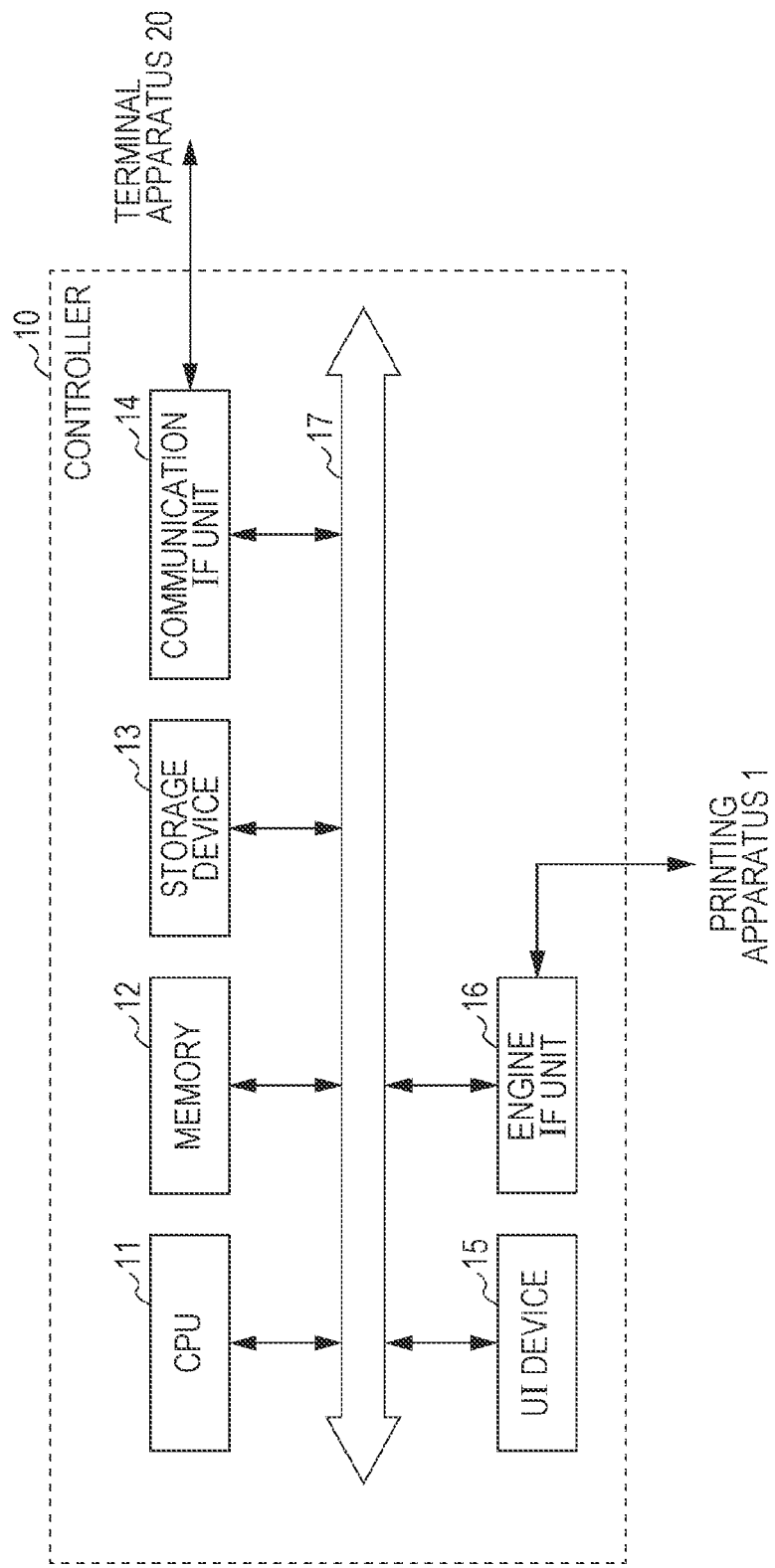
FIG. 2 is a block diagram illustrating the hardware configuration of a controller of the printing system according to the first exemplary embodiment of the present invention.

Referring now to FIG. 2, the hardware configuration of the controller 10 included in the printing system according to the first exemplary embodiment will be described. As illustrated in FIG. 2, the controller 10 according to the first exemplary embodiment includes a central processing unit (CPU) 11, a memory 12, a storage device 13 such as a hard disk drive (HDD), a communication interface (IF) unit 14 that exchanges data with the terminal apparatus 20 via the network, a user interface (UI) device 15 including a touch screen and a liquid crystal display, and an engine IF unit 16 that exchanges data with the printing apparatus 1. These components are interconnected via a control bus 17.

The CPU 11 executes predetermined processes on the basis of a control program for printing stored in the memory 12 or the storage device 13, thereby controlling operations of the controller 10. Although the CPU 11 reads out and executes the control program stored in the memory 12 or the storage device 13 in the description of the first exemplary embodiment, the control program may be stored on a portable storage medium, such as a compact disc-read only memory (CD-ROM), and be provided to the CPU 11.

Figure 3:
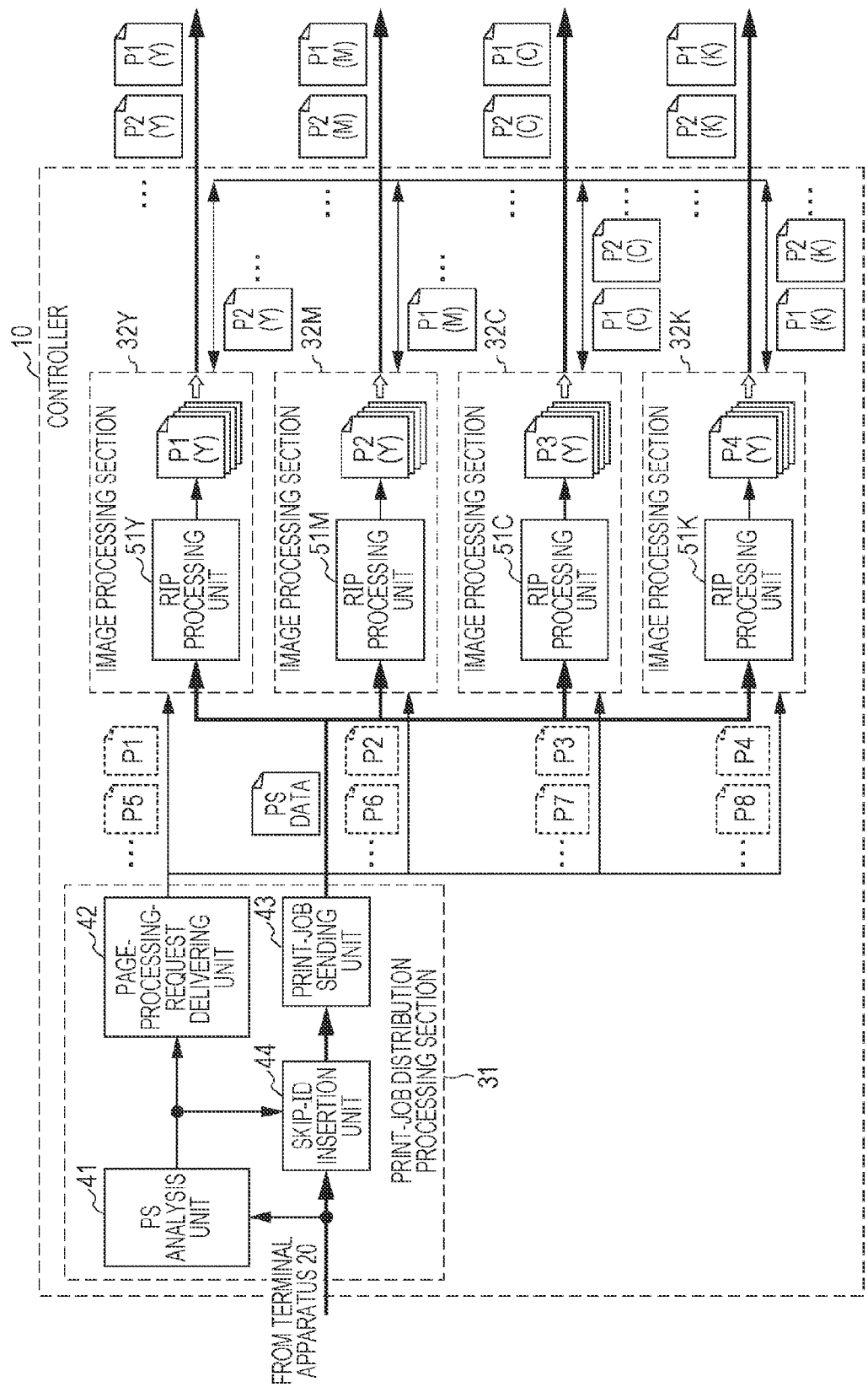
FIG. 3 is a block diagram illustrating the functional configuration of the controller of the printing system according to the first exemplary embodiment of the present invention.

FIG. 3 is a block diagram illustrating the functional configuration of the controller 10, which is implemented as a result of execution of the control program.

As illustrated in FIG. 3, the controller 10 according to the first exemplary embodiment includes a print-job distribution processing section 31 and four image processing sections 32Y, 32M, 32C, and 32K each provided for a corresponding assigned primary color.

Here, the term "assigned primary color" refers to a color assigned to a corresponding one of the image processing sections 32Y, 32M, 32C, and 32K each provided for a corresponding one of printing primary colors. For example, when four colors, i.e., yellow, magenta, cyan, and black, are used as the printing primary colors, the assigned primary colors are these colors which are each assigned to a corresponding one of the image processing sections 32Y, 32M, 32C, and 32K provided for the colors.

The print-job distribution processing section 31 has a function of analyzing commands of a print job (corresponding to a print instruction) sent from the terminal apparatus 20. Specifically, the print-job distribution processing section 31 includes a PostScript (PS) analysis unit 41, a page-processing-request delivering unit 42, a print-job sending unit 43, and a skip-ID insertion unit 44.

Page description languages (PDLs) are often used to write print jobs sent from the terminal apparatus 20.

PDLs include non-page-independent PDLs in which a change made on a print resource on a certain page is also applied to other pages, and page-independent PDLs in which information for use in a drawing process of a certain page is collectively written within the page. That is, a print job represented in a page-independent PDL is dividable into pages relatively easily. In contrast, it is not easy to divide a print job represented in a non-page-independent PDL into pages.

For example, a portable document format (PDF) is a page-independent PDL, whereas PostScript (registered trademark) is a non-page-independent PDL.

In the description of the first exemplary embodiment, a print job written in PostScript is used as an example of a non-page-independent print job. However, the exemplary embodiment of the present invention is similarly applicable to a print job that is written in another non-page-independent PDL.

Upon receipt of PostScript (PS) data, which is a non-page-independent print job, from the terminal apparatus 20, the PS analysis unit 41 analyzes commands contained in the print job to determine attributes of various kinds of information, such as the number of pages, the page size, information about extra colors used for the print job, embedded profile information, and described page device information.

In accordance with the analysis result obtained by the PS analysis unit 41, the skip-ID insertion unit 44 inserts a skip identifier (ID) into the PDL of the print job received from the terminal apparatus 20. A skip ID is an identifier indicating a range not containing a command that influences a drawing process of other pages. A skip ID insertion process will be described in detail later.

Before a printing process is started, the print-job sending unit 43 sends the entirety of a print job including multiple pages, which has been received from the terminal apparatus 20 and has undergone the skip ID insertion process performed by the skip-ID insertion unit 44, to the four image processing sections 32Y, 32M, 32C, and 32K.

With reference to the analysis result obtained by the PS analysis unit 41, the page-processing-request delivering unit 42 sends each processing request to a corresponding one of the four image processing sections 32Y, 32M, 32C, and 32K. Each processing request specifies which page of the print job is to be subjected to image processing. Here, the page-processing-request delivering unit 42 delivers each processing request to a corresponding one of the image processing sections 32Y, 32M, 32C, and 32K in accordance with an order in which pages are arranged in the print job.

The image processing sections 32Y, 32M, 32C, and 32K include raster image processing (RIP) processing units 51Y, 51M, 51C, and 51K, respectively. Each of the RIP processing units 51Y, 51M, 51C, and 51K converts PostScript data of a page specified by a processing request sent from the page-processing-request delivering unit 42, into pieces of print data for primary colors.

Each of the image processing sections 32Y, 32M, 32C, and 32K has a transfer function of transferring to the other image processing sections, pieces of print data for the primary colors other than the color assigned thereto, among the pieces of print data for the primary colors generated by the corresponding RIP processing unit 51Y, 51M, 51C, or 51K; and an output function of outputting the pieces of print data for the assigned color generated by the corresponding RIP processing unit 51Y, 51M, 51C, or 51K and the pieces of print data transferred from the other image processing sections.

The controller 10 also includes print controllers (not illustrated in FIG. 3) that control printing mechanism sections each provided for a corresponding one of the primary colors in the printing apparatus 1 to output an image on a print sheet, on the basis of a corresponding one of the pieces of print data generated by the image processing sections 32Y, 32M, 32C, and 32K.

In the example illustrated in FIG. 3, processing requests that specify drawing processes of page 1 (P1), page 5 (P5), . . . are sent to the image processing section 32Y.

Similarly, processing requests that specify drawing processes of page 2 (P2), page 6 (P6), . . . are sent to the image processing section 32M. Processing requests that specify drawing processes of page 3 (P3), page 7 (P7) . . . are sent to the image processing section 32C. Processing requests that specify drawing processes of page 4 (P4), page 8 (P8) . . . are sent to the image processing section 32K.

The image processing section 32Y first performs a rasterizing process in which the RIP processing unit 51Y converts PostScript data of page 1, among the entire PostScript data sent from the print-job sending unit 43, into pieces of print data for the primary colors. The image processing section 32Y then transfers, among the pieces of print data resulting from the rasterizing process, magenta print data P1(M) to the image processing section 32M, cyan print data P1(C) to the image processing section 32C, and black print data P1(K) to the image processing section 32K.

Similarly, the image processing section 32M performs a rasterizing process in which the RIP processing unit 51M converts PostScript data of page 2, among the entire PostScript data sent from the print-job sending unit 43, into pieces of print data for the primary colors. The image processing section 32M then transfers, among the pieces of print data resulting from the rasterizing process, yellow print data P2(Y) to the image processing section 32Y, cyan print data P2(C) to the image processing section 32C, and black print data P2(K) to the image processing section 32K.

In this manner, the image processing sections 32Y, 32M, 32C, and 32K sequentially perform rasterizing processes on individual pages, and transfer the resulting print data of other primary colors to the corresponding image processing sections responsible for the corresponding primary colors. The print controllers (not illustrated) provided for the corresponding primary colors control the printing mechanism sections provided for the primary colors in the printing apparatus 1 on the basis of the generated pieces of print data for the primary colors, thereby outputting an image on a print sheet.

Now, configurations of the RIP processing units 51Y, 51M, 51C, and 51K will be described. Although the configuration of the RIP processing unit 51Y will be described with reference to FIG. 4 here, the RIP processing units 51M, 51C, and 51K also have the similar configurations.

Figure 4:
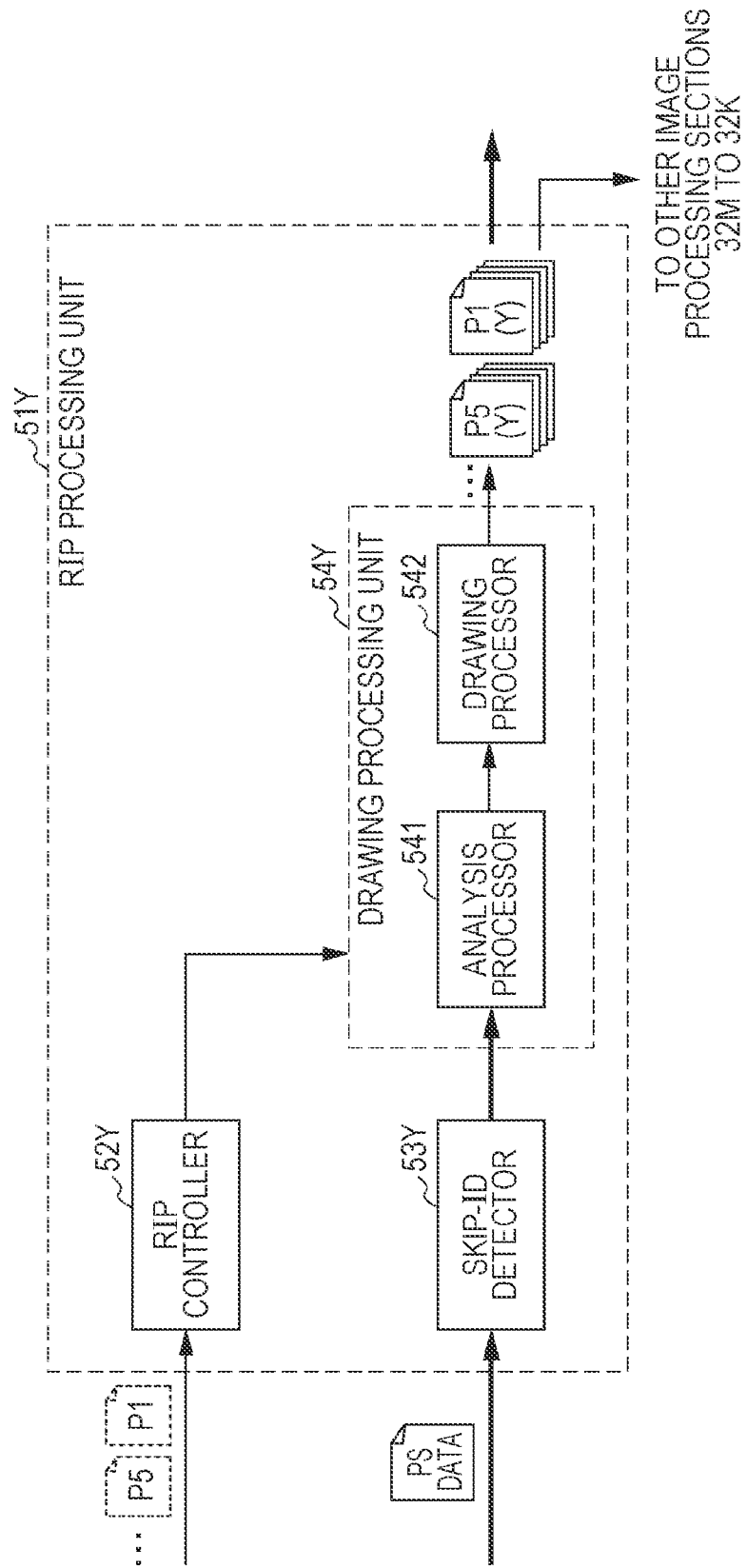
FIG. 4 is a block diagram illustrating the configuration of a RIP processing unit illustrated in FIG. 3.

As illustrated in FIG. 4, the RIP processing unit 51Y includes a RIP controller 52Y, a skip-ID detector 53Y, and a drawing processing unit 54Y.

The RIP controller 52Y transfers, to the drawing processing unit 54Y, processing requests delivered thereto by the page-processing-request delivering unit 42, thereby controlling operations of the drawing processing unit 54Y.

The skip-ID detector 53Y detects a skip ID inserted in the PDL of the print job sent from the print-job sending unit 43.

The drawing processing unit 54Y is implemented by software called a configurable PostScript interpreter (CPSI). The drawing processing unit 54Y performs a drawing process on part of a print job for a page specified by a processing request delivered by the page-processing-request delivering unit 42, among the print job sent from the print-job sending unit 43, so as to generate raster-format print data. Specifically, the drawing processing unit 54Y converts a print job written in PostScript temporarily into image data of intermediate format and then ultimately into image data of raster format.

During this drawing process, the drawing processing unit 54Y needs to perform an analysis process on the print job sent from the print-job sending unit 43 from the first page of the print job to the page specified by the processing request instead of just referring to the specified page of the print job.

Accordingly, as illustrated in FIG. 4, the drawing processing unit 54Y includes two functional blocks: an analysis processor 541 and a drawing processor 542.

The analysis processor 541 performs an analysis process on a print job sent from the print-job sending unit 43 from the first page of the print job to a page specified by a processing request. In accordance with the analysis result obtained by the analysis processor 541, the drawing processor 542 performs a drawing process on the page specified by the processing request among the print job sent from the print-job sending unit 43 so as to convert PostScript data into raster-format print data.

The following describes the reason why the drawing processing unit 54Y needs to perform an analysis process from the first page of the print job to the page specified by the processing request instead of only the specified page.

As described above, PostScript is a non-page-independent PDL. Accordingly, the content of print resources, such as the font and form, set on a certain page is also effective on other pages.

Figure 5:
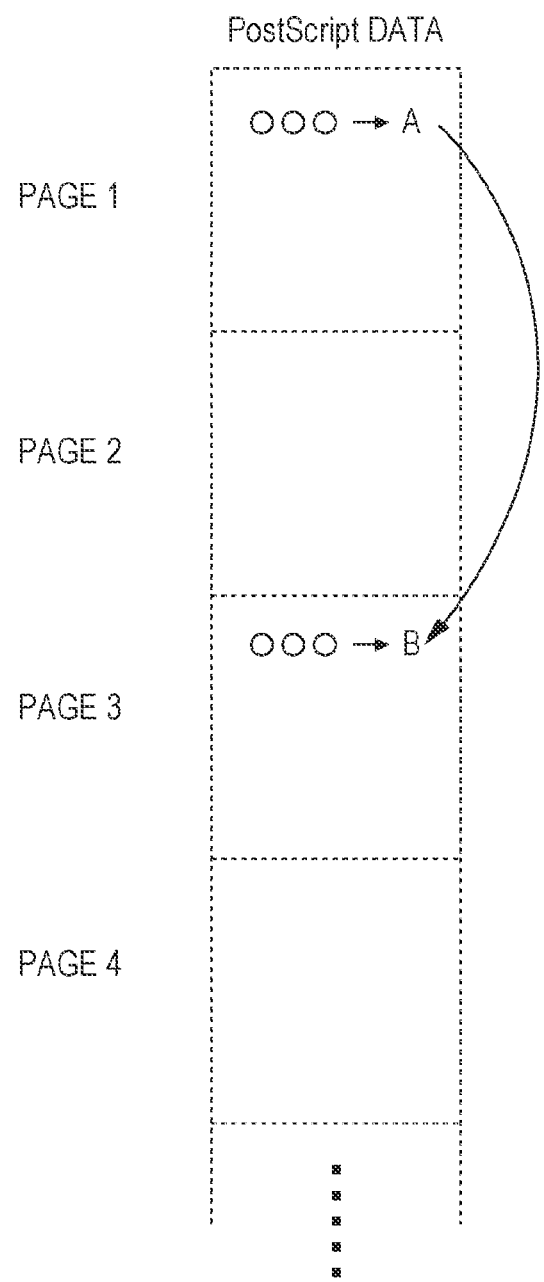
FIG. 5 illustrates the structure of PostScript data.

For example, a case will be described where the content of a certain print resource (OOO) is set to "A" on page 1, and the content is then changed to "B" on page 3 as illustrated in FIG. 5.

In the case illustrated in FIG. 5, when a drawing process is performed for page 4 using this print resource, the drawing process for page 4 is not performed successfully unless a command on page 3 is executed. Thus, the drawing process of the print job for page 4 requires execution of commands included in pages 1 to 3.

When a drawing process is performed for a certain page of a print job written in a non-page-independent PDL such as PostScript, the print job is analyzed from the first page to determine whether or not a command that influences a drawing process of other pages is included. If such a command is included, the command needs to be executed.

For this reason, when performing a drawing process for a page specified by a processing request, the drawing processing unit 54Y needs to perform an analysis process from the first page of the print job to the page specified by the page request instead of only the specified page.

Figure 6:
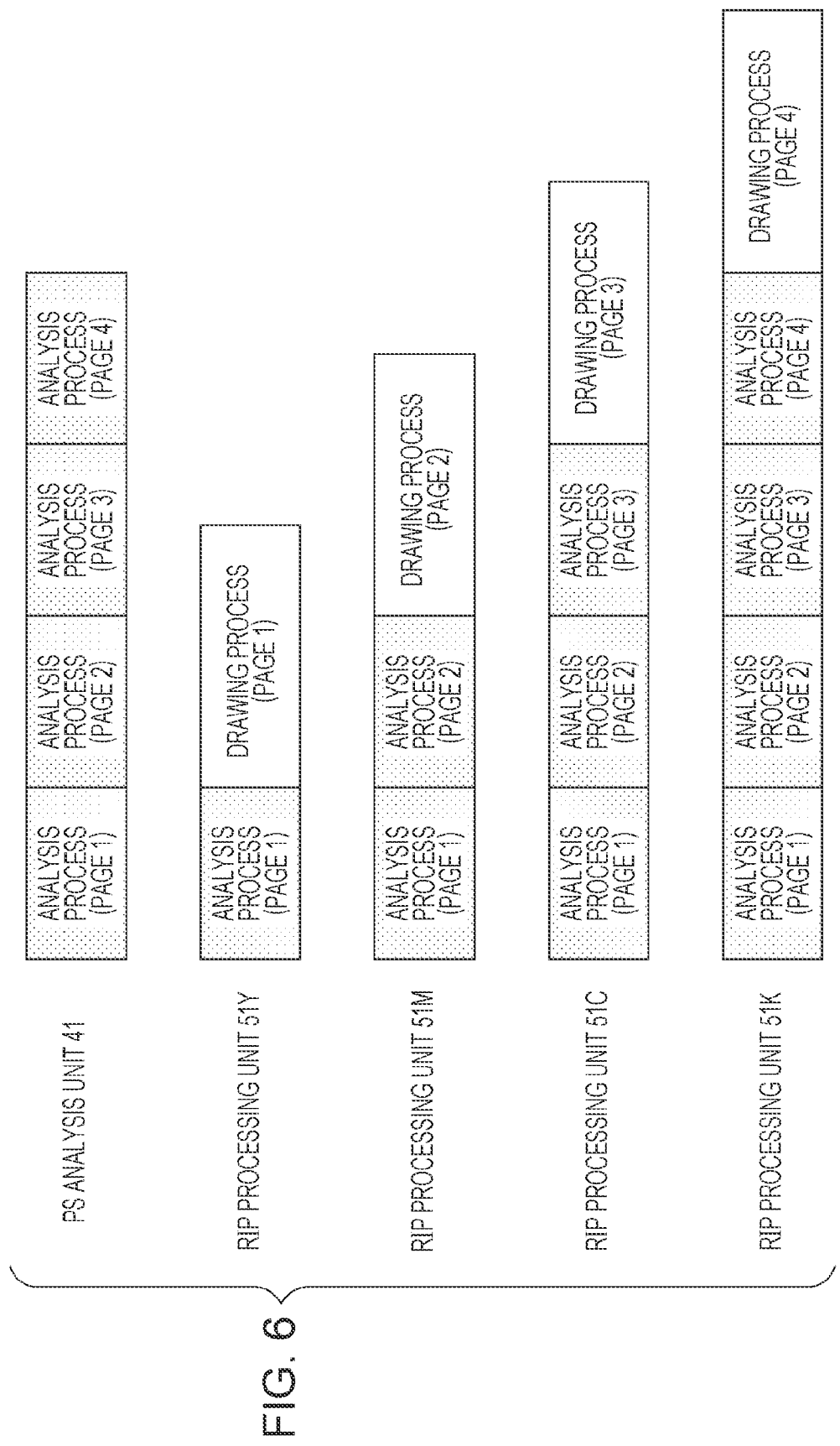
FIG. 6 describes a relationship between an analysis process and a drawing process performed in the RIP processing units.

Referring to FIG. 6, a description will be given of processing performed in the system configured as illustrated in FIG. 3 when processing requests that specify drawing processes of page 1 (P1), page 2 (P2), page 3 (P3), and page 4 (P4) are sent to the RIP processing units 51Y, 51M, 51C, and 51K, respectively.

In this case, the RIP processing unit 51Y performs an analysis process on a print job for page 1 (P1) and then performs a drawing process for page 1 (P1). In contrast, the RIP processing unit 51M needs to perform an analysis process on the print job for page 1 (P1) and page 2 (P2) and then perform a drawing process for page 2 (P2).

Similarly, the RIP processing unit 51C needs to perform an analysis process on the print job for page 1 (P1) to page 3 (P3) and then perform a drawing process for page 3 (P3). The RIP processing unit 51K needs to perform an analysis process on the print job for page 1 (P1) to page 4 (P4) and then perform a drawing process for page 4 (P4).

The PS analysis unit 41 also performs an analysis process of the PDL for each page of the print job. However, in the analysis process performed by the PS analysis unit 41, a page counting process for grasping the number of pages constituting the entire print job is performed in order to deliver each processing request to a corresponding one of the image processing sections 32Y, 32M, 32C, and 32K. For this reason, the specific processing content of the analysis process performed by the PS analysis unit 41 is different from those of the drawing processing units 54Y, 54M, 54C, and 54K of the RIP processing units 51Y, 51M, 51C, and 51K, respectively.

Referring back to FIG. 4, the description about the configuration of the RIP processing unit 51Y will go on. The analysis processor 541 of the drawing processing unit 54Y performs an analysis process on a print job sent from the print-job sending unit 43 from the first page of the print job to a page specified by a processing request delivered from the page-processing-request delivering unit 42. During this analysis process, the analysis processor 541 refers to a skip ID detected by the skip-ID detector 53Y in the PDL for pages of the print job other than the page specified by the processing request, and does not perform an analysis process for a range not containing a command that influences a drawing process of other pages.

For example, in the case where a processing request specifies a drawing process of page 2 and skip IDs are inserted in page 1 of the print job, the analysis processor 541 does not perform an analysis process for a range indicated by these skip IDs.

Referring now to FIGS. 7 and 8, a specific example of such skip IDs will be described.

FIG. 7 illustrates an example of a print job written in PostScript and including image data subjected to a drawing process. When each of the drawing processing units 54Y, 54M, 54C, and 54K performs an analysis process on such image data, the analysis process requires a long period because image data is often encoded and the encoded image data needs to be decoded during the analysis process. However, such image data does not include a command that influences a drawing process of other pages.

Accordingly, in the first exemplary embodiment, if an analysis process performed by the PS analysis unit 41 reveals that PostScript data contains image data, the skip-ID insertion unit 44 illustrated in FIG. 3 inserts a code 81 which indicates the start of image data and a code 82 which indicates the end of image data in front of and behind the image data contained in this PostScript data, respectively, as illustrated in FIG. 8. Here, the codes 81 and 82 are skip IDs.

The skip IDs inserted by the skip-ID insertion unit 44 are detected by the skip-ID detector 53Y in the RIP processing unit 51Y illustrated in FIG. 4. Then, for pages of the print instruction other than the page specified by the processing request, the analysis processor 541 refers to the skip IDs detected by the skip-ID detector 53Y in the PDL, and skips reading of data without performing an analysis process of the image data which does not contain a command that influences a drawing process of other pages.

The action "skipping reading of data without performing an analysis process" does not indicate that the analysis processor 541 does not read data at all but indicates that the analysis processor 541 reads data but does not perform an analysis process (interpretation process) on the data.

To perform an analysis process of a PDL such as PostScript and execute necessary commands, the following operation needs to be repeatedly performed. PostScript data is sequentially read in certain units and is stacked. If the read data contains a command for a predetermined process, the process is performed on the stacked data.

The skip IDs of the first exemplary embodiment indicate in advance that an analysis process is not needed because data between the code 81 which indicates the start of image data and the code 82 which indicates the end of image data is image data. In such a case, it is only determined whether or not the read data matches the code 82 which indicates the end of image data. Only determining whether or not the read data is the code 82 which indicates the end of image data permits skipping reading of the data, and thus decreases a processing period by a large amount compared to the case where the analysis process is performed in the above-described manner.

Referring to FIGS. 9A and 9B, a description will be given of processing performed when processing requests that specify drawing processes of page 1 (P1) which contains image data, page 2 (P2), page 3 (P3), and page 4 (P4) are sent to the RIP processing units 51Y, 51M, 51C, and 51K, respectively, as in the case illustrated in FIG. 6.

In the printing system according to the first exemplary embodiment, the code 81 which indicates the start of image data and the code 82 which indicates the end of image data are inserted as skip IDs in data of page 1 by the skip-ID insertion unit 44 as illustrated in FIG. 9A.

Referring to FIG. 9B, in such a case, a time period required for an analysis process does not decrease in the RIP processing unit 51Y which has received a processing request that specifies a drawing process of page 1 (P1). However, in the RIP processing units 51M, 51C, and 51K which have received processing requests that specify drawing processes of page 2 (P2), page 3 (P3), and page 4 (P4), respectively, does not perform an analysis process for image data contained in the data of page 1 when performing the analysis process to the specified page. As a result, a processing period required for the analysis process for page 1 is reduced.

Then, in accordance with the result of the analysis process performed by the analysis processor 541, the drawing processor 542 performs a drawing process for the page specified by the processing request among the print job sent from the print-job sending unit 43 to convert the PDL data into raster-format print data.

Among pieces of print data resulting from rasterizing processing, the magenta print data P1(M) is transferred to the image processing section 32M, the cyan print data P1(C) is transferred to the image processing section 32C, and the black print data P1(K) is transferred to the image processing section 32K. Then, the printing mechanism sections of corresponding colors of the printing apparatus 1 each perform a printing process in accordance with the corresponding print data obtained as a result of a corresponding one of the RIP processing units 51Y, 51M, 51C, and 51K performing a drawing process.

Second Exemplary Embodiment

Now, a printing system (corresponding to an image forming system) according to a second exemplary embodiment of the present invention will be described.

Figure 10:
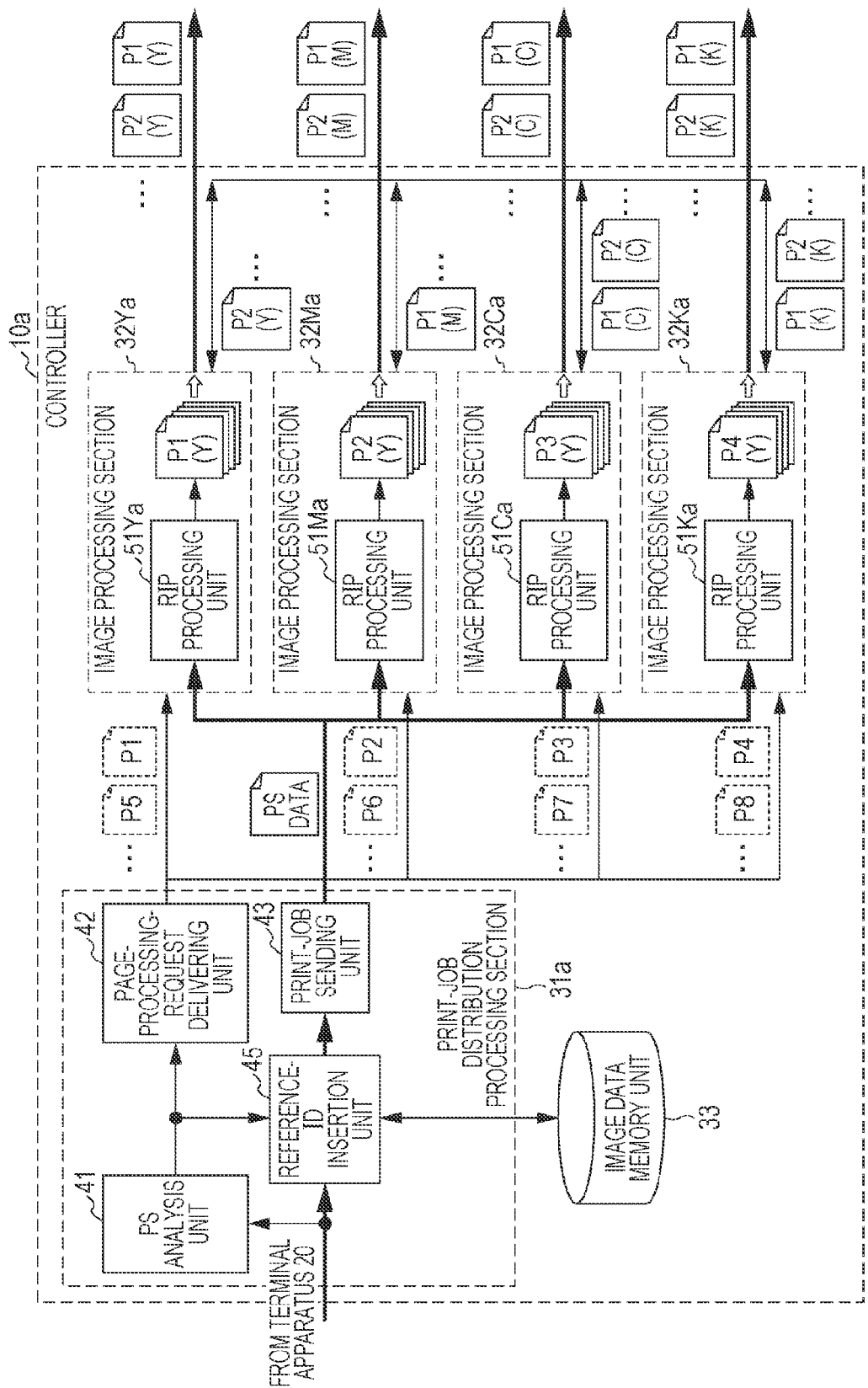
FIG. 10 is a block diagram illustrating the functional configuration of a controller of a printing system according to a second exemplary embodiment of the present invention.
Figure 11:
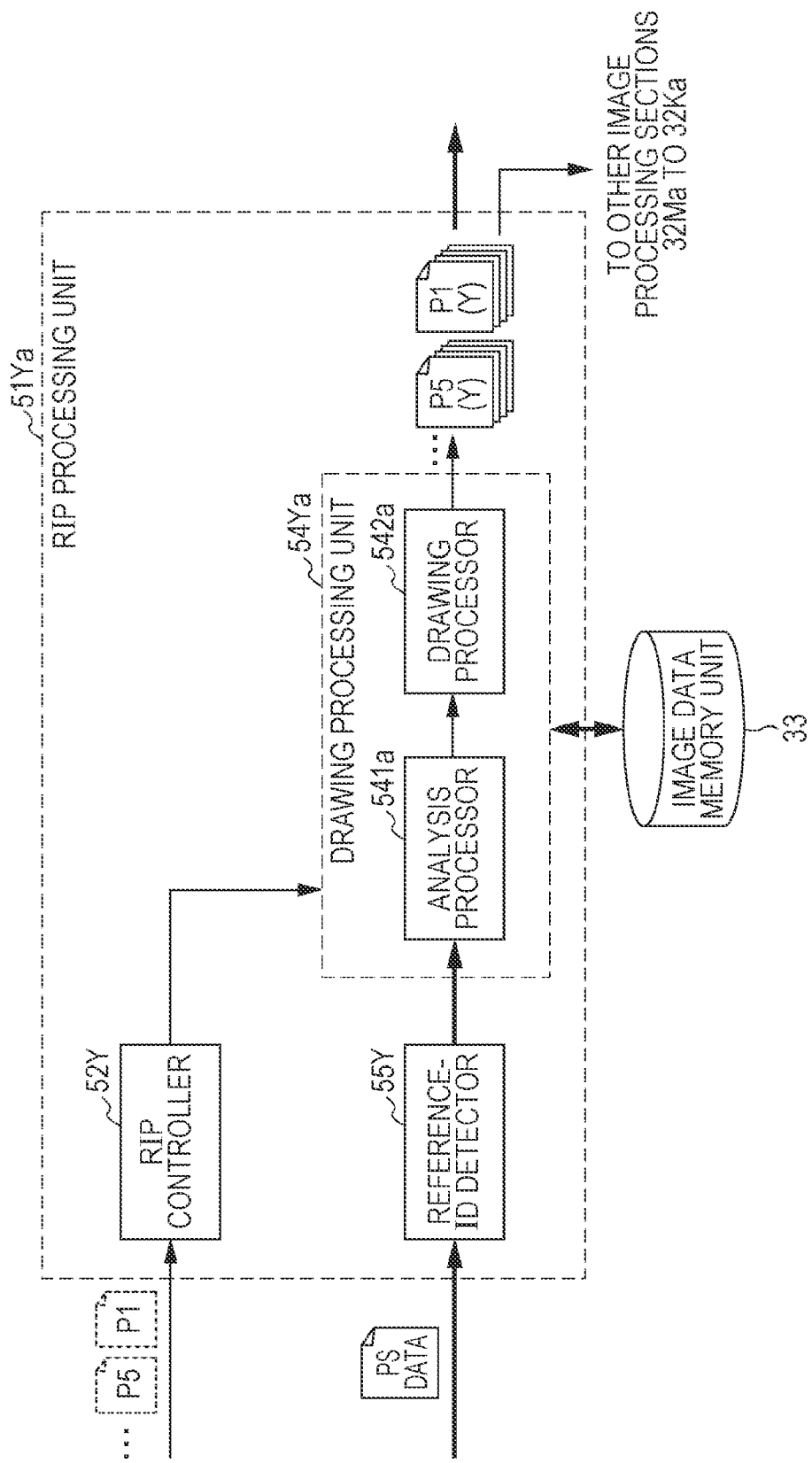
FIG. 11 is a block diagram illustrating the configuration of a RIP processing unit illustrated in FIG. 10.

The configuration of the printing system according to the second exemplary embodiment of the present invention is similar to that of the first exemplary embodiment illustrated in FIG. 1 except that the controller 10 is replaced with a controller 10a illustrated in FIG. 10.

As illustrated in FIG. 10, the controller 10a of the second exemplary embodiment differs from the controller 10 illustrated in FIG. 3 in that the skip-ID insertion unit 44 is replaced with a reference-ID insertion unit 45, an image data memory unit 33 is additionally included, and the image processing sections 32Y, 32M, 32C, and 32K are respectively replaced with image processing sections 32Ya, 32Ma, 32Ca, and 32Ka.

Also, a RIP processing unit 51Ya of the second exemplary embodiment differs from the RIP processing unit 51Y illustrated in FIG. 4 in that the skip-ID detector 53Y is replaced with a reference-ID detector 55Y and the drawing processing unit 54Y which includes the analysis processor 541 and the drawing processor 542 is replaced with a drawing processing unit 54Ya which includes an analysis processor 541a and a drawing processor 542a.

The image data memory unit 33 stores image data contained in PDL data representing a print job and a reference identifier (ID) in association with each other.

In accordance with the analysis result obtained by the PS analysis unit 41, the reference-ID insertion unit 45 of the second exemplary embodiment causes the image data memory unit 33 to store image data contained in the PDL of the print job, and replaces the image data in the PDL with a reference ID corresponding to the stored image data so as to insert the reference ID in the PDL.

Figure 12:
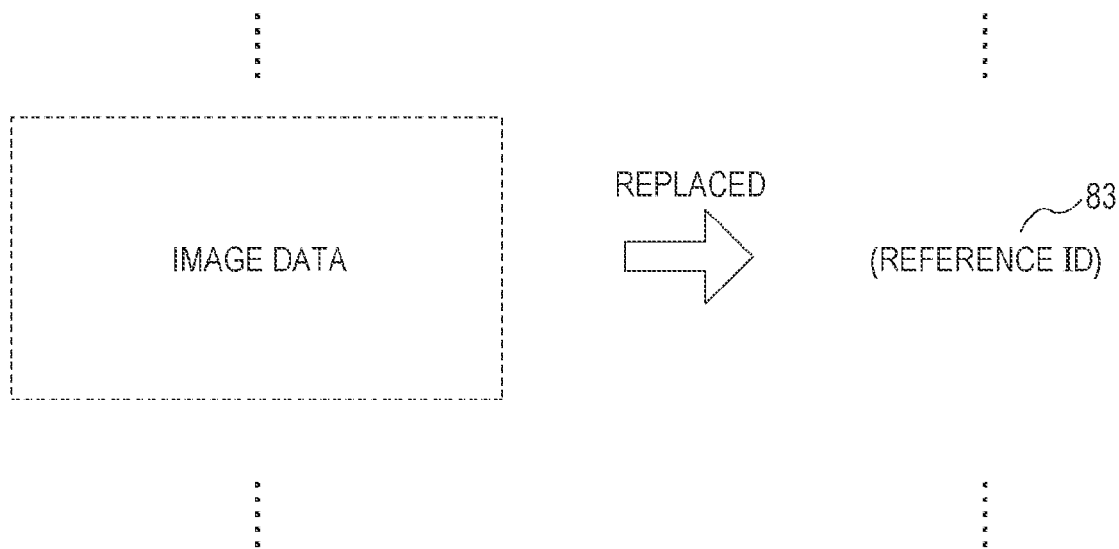
FIG. 12 illustrates how image data in a page description language is replaced with a reference ID.

For example, as illustrated in FIG. 12, in the case where a certain page of PostScript data contains data for an instruction to draw image data, the reference-ID insertion unit 45 replaces this image data with a reference ID 83 and stores this image data in the image data memory unit 33 in association with the reference ID 83.

Figure 13:
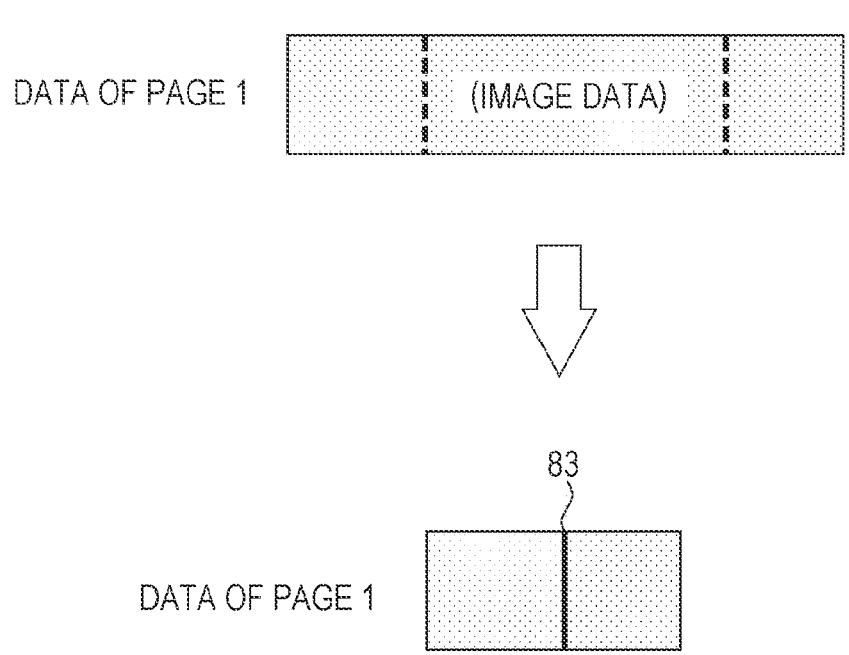
FIG. 13 illustrates how image data is replaced with a reference ID in the case where the image data is contained in data of page 1 of a print job.

For example, in the case where data of page 1 of a print job contains image data, the reference-ID insertion unit 45 replaces this image data with the reference ID 83 as illustrated in FIG. 13.

In the second exemplary embodiment, the reference-ID detector 55Y of the RIP processing unit 51Ya detects the reference ID inserted in the PDL of the print job sent from the print-job sending unit 43.

The analysis processor 541a performs an analysis process on the print job sent from the print-job sending unit 43 from the first page of the print job to a page specified by a processing request delivered from the page-processing-request delivering unit 42. During this analysis process, the analysis processor 541a refers to the reference ID detected by the reference-ID detector 55Y in the PDL for pages of the print instruction other than the page specified by the processing request and does not perform the analysis process for a range not containing a command that influences a drawing process of other pages.

For example, in the case where a processing request specifies a drawing process of page 2 and a reference ID is inserted in data of page 1 of a print job, the analysis processor 541a does not perform an analysis process on image data associated with this reference ID.

In the case where a processing request specifies a drawing process of page 1 and a reference ID is inserted in data of page 1 of a print job, the analysis processor 541a reads image data associated with this reference ID from the image data memory unit 33 and performs an analysis process on the image data. In the case where a processing request specifies a drawing process of page 1 and a reference ID is inserted in data of page 1 of a print job, the drawing processor 542a also reads the image data associated with this reference ID from the image data memory unit 33 and performs a drawing process on the image data.

While the cases of inserting the skip IDs in front of and behind image data and of replacing the image data with the reference ID have been described in the first and second exemplary embodiments, the present invention is not limited to such configurations. For example, the present invention is similarly applicable to specific non-image data, for example, form data or embedded font data, which requires a long period to perform an analysis process but does not contain a command that influences a drawing process of other pages.

Third Exemplary Embodiment

Now, a printing system (corresponding to an image forming system) according to a third exemplary embodiment of the present invention will be described.

Figure 14:
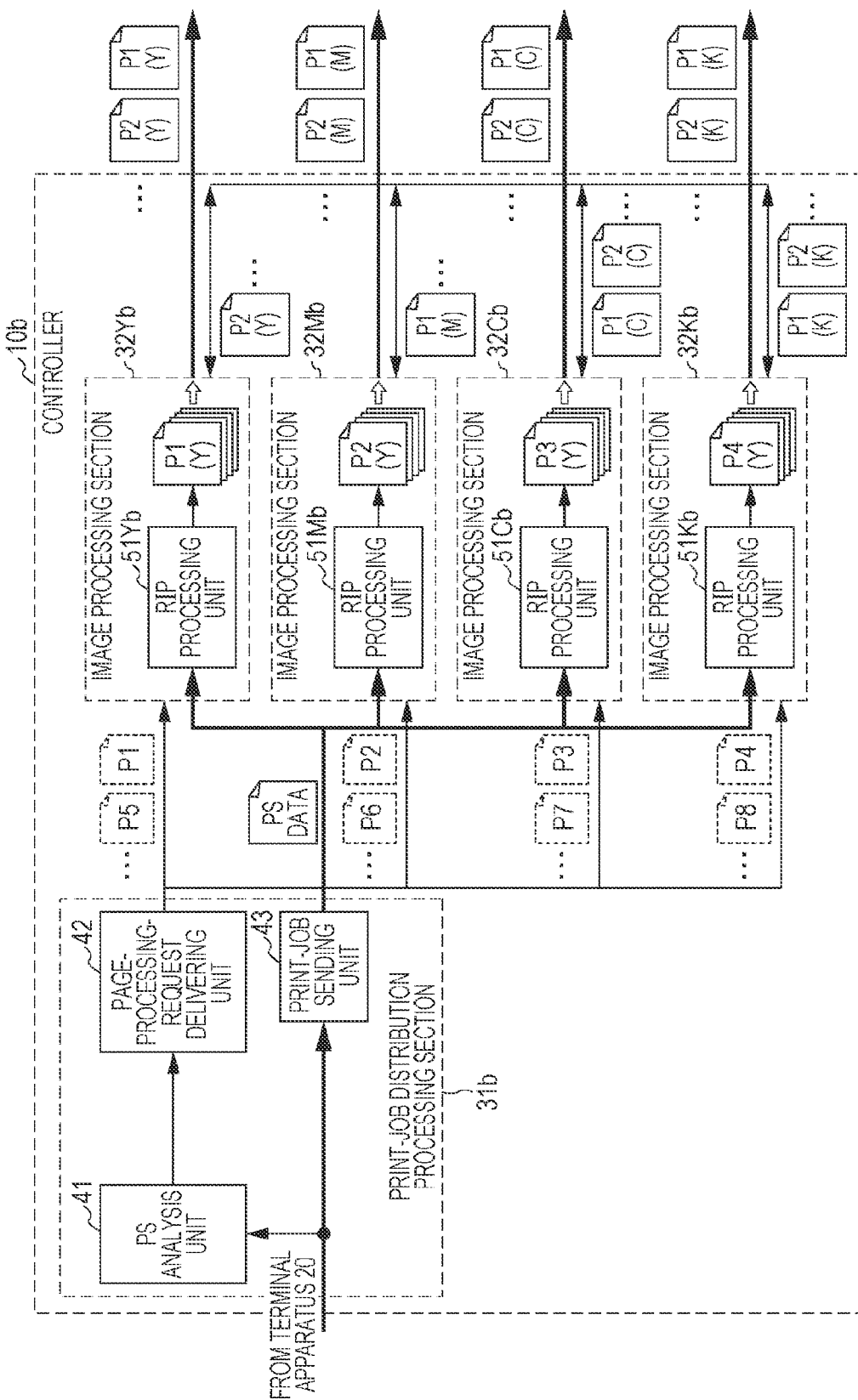
FIG. 14 is a block diagram illustrating the functional configuration of a controller of a printing system according to a third exemplary embodiment of the present invention.

The configuration of the printing system according to the third exemplary embodiment of the present invention is similar to that of the first exemplary embodiment illustrated in FIG. 1 except that the controller 10 is replaced with a controller 10b illustrated in FIG. 14.

As illustrated in FIG. 14, the controller 10b of the third exemplary embodiment includes a print-job distribution processing section 31b and image processing sections 32Yb, 32Mb, 32Cb, and 32Kb.

The print-job distribution processing section 31b of the third exemplary embodiment differs from the print-job distribution processing section 31 of the first exemplary embodiment illustrated in FIG. 3 in that the skip-ID insertion unit 44 is removed.

Also, the image processing sections 32Yb, 32Mb, 32Cb, and 32Kb of the third exemplary embodiment differ from the image processing sections 32Y, 32M, 32C, and 32K of the first exemplary embodiment illustrated in FIG. 3 in that the RIP processing units 51Y, 51M, 51C, and 51K are respectively replaced with RIP processing units 51Yb, 51Mb, 51Cb, and 51Kb.

Figure 15:
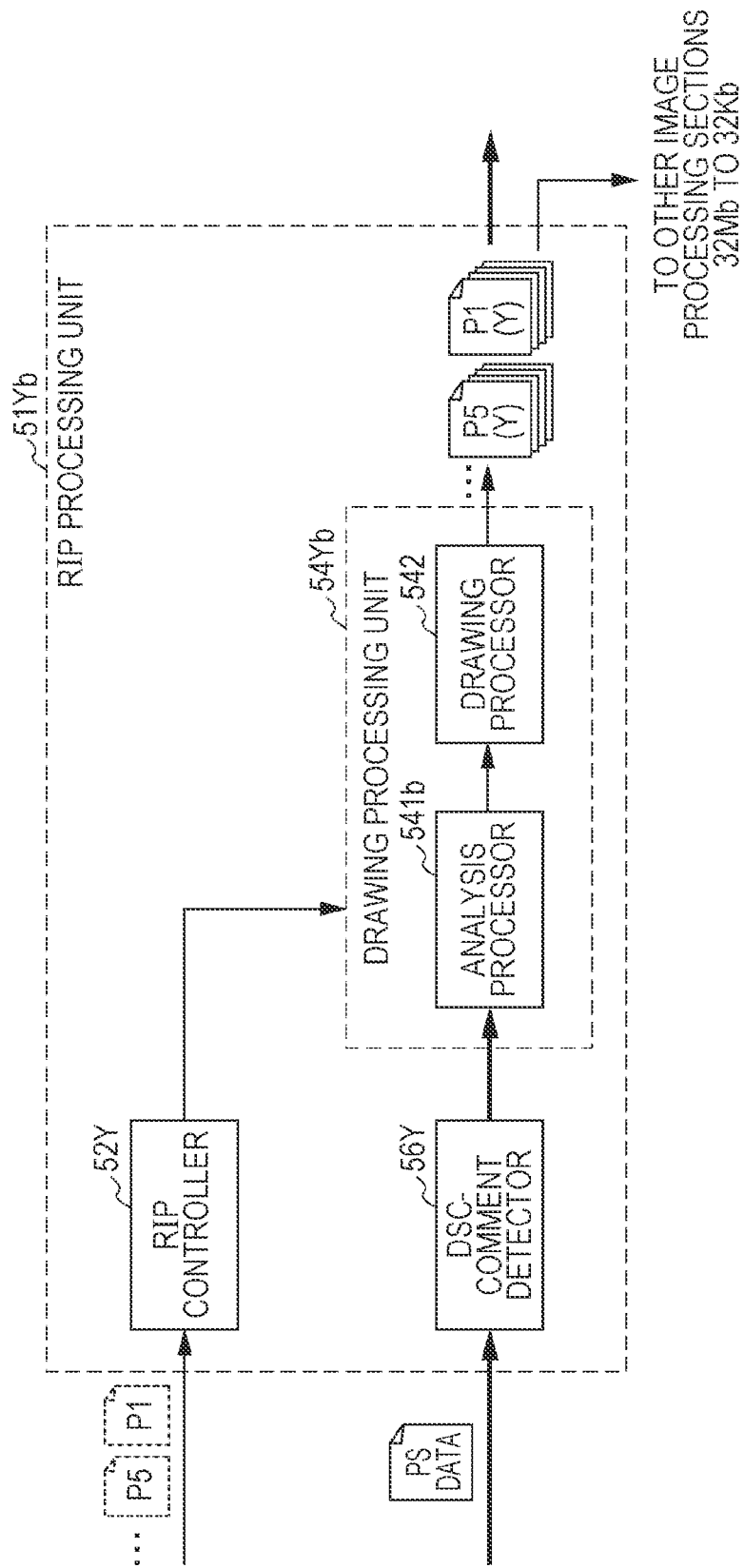
FIG. 15 is a block diagram illustrating the configuration of a RIP processing unit illustrated in FIG. 14.

In addition, as illustrated in FIG. 15, the RIP processing unit 51Yb of the third exemplary embodiment differs from the RIP processing unit 51Y illustrated in FIG. 4 in that the skip-ID detector 53Y is replaced with a document structuring conventions-comment (DSC-comment) detector 56Y and the drawing processing unit 54Y which includes the analysis processor 541 and the drawing processor 542 is replaced with a drawing processing unit 54Yb which includes an analysis processor 541b and the drawing processor 542.

The DSC-comment detector 56Y detects a DSC comment, particularly, a DSC comment (corresponding to an identifier) representing a page section, contained in a PDL of a print job sent from the print-job sending unit 43.

Here, a DSC comment is syntax for a comment defined by DSC and describes various kinds of information regarding PostScript data. The DSC comment generally starts with two percent signs (%%), which are followed by a comment keyword that indicates what this DSC comment describes or the content of the DSC comment.

Referring to FIG. 16, an example of such DSC comments will be described.

The example illustrated in FIG. 16 includes "%% Page: 11" and "%% Page: 22", which are DSC comments each representing a page section among various DSC comments.

If a page section is indicated by such a DSC comment, the sectioned page does not contain any command that influences a drawing process of other pages. Conversely, it is defined that the use of the DSC comment to provide a page section is permitted only when the page does not contain any command that influences a drawing process of other pages.

The analysis processor 541b of the third exemplary embodiment performs an analysis process on a print job sent from the print-job sending unit 43 from the first page of the print job to a page specified by a processing request delivered from the page-processing-request delivering unit 42. During this analysis process, the analysis processor 541b of the third exemplary embodiment refers to the DSC comment detected by the DSC comment detector 56Y in the PDL for pages of the print job other than the page specified by the processing request, and does not perform the analysis process for the page sectioned by the DSC comment because the DSC comment indicates a range not containing a command that influences a drawing process of other pages.

In the third exemplary embodiment, a DSC comment representing a page section is detected as a specific word originally contained in a PDL in which a print job is written. In this way, the drawing processing unit 54Yb reduces the amount of processing required for an analysis process of pages other than the specified page. Thus, the controller 10b of the third exemplary embodiment need not add an identifier, such as a skip ID or a reference ID, to a print job written in a PDL, unlike the first and second exemplary embodiments described above.

Modifications

In the first to third exemplary embodiments, the entirety of a print job is sent from the print-job sending unit 43 to the image processing sections 32Y, 32M, 32C, and 32K; however, the present invention is not limited to such a configuration. The present invention is also applicable to a case where the entirety of a print job including multiple pages is stored in a storage unit and reference data (corresponding to reference information) used for accessing the print job stored in the storage unit is sent from the print-job sending unit 43 to the image processing sections 32Y, 32M, 32C, and 32K instead of the entirety of the print job.

When such a configuration is employed, the RIP controllers 52Y, 52M, 52C, and 52K of the RIP processing units 51Y, 51M, 51C, and 51K deliver the reference data along with a processing request to the drawing processing units 54Y, 54M, 54C, and 54K, respectively. Then, in accordance with the reference data delivered from a corresponding one of the RIP controllers 52Y, 52M, 52C, and 52K, each of the drawing processing units 54Y, 54M, 54C, and 54K accesses the print job stored in the storage unit and converts part of the print job for a page specified by the delivered processing request into print data, thereby performing a drawing process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
a processor;
a memory configured to store instructions for execution by the processor;
a plurality of drawing processing units that perform a drawing process on a print instruction written in a page description language;
a sending unit that sends the entirety of a print instruction including a plurality of pages, to the plurality of drawing processing units; and
a delivering unit that delivers each of processing requests to a corresponding one of the plurality of drawing processing units, each of the processing requests specifying which page of the print instruction is to be subjected to a drawing process,
wherein when each of the plurality of drawing processing units performs, in order to perform a drawing process in which a print instruction for a page specified by a processing request delivered by the delivering unit is converted into print data, an analysis process on the print instruction from the first page of the print instruction to the specified page, the drawing processing unit refers to an identifier in the page description language of the print instruction for pages other than the page specified by the processing request delivered by the delivering unit, and does not perform the analysis process for a range not containing a command that influences a drawing process of other pages.

2. The print control apparatus according to claim 1, wherein the identifier is a specific word that is originally contained in the page description language in which the print instruction is written.

3. The print control apparatus according to claim 1, further comprising:
an analysis unit that performs an analysis process on the print instruction before the print instruction is delivered to the plurality of drawing processing units; and
an identifier insertion unit that inserts, on the basis of an analysis result obtained by the analysis unit, an identifier into the page description language of the print instruction, the identifier indicating a range not containing a command that influences a drawing process of other pages,
wherein each of the plurality of drawing processing units refers to an identifier inserted by the identifier insertion unit and does not perform the analysis process for a range not containing a command that influences a drawing process of other pages.

4. The print control apparatus according to claim 3, wherein the identifier inserted into the page description language by the identifier insertion unit is an identifier inserted in front of and behind specific data contained in the page description language.

5. The print control apparatus according to claim 3,
wherein the memory stores specific data contained in the page description language in which the print instruction is written and an identifier in association with each other,
wherein on the basis of an analysis result obtained by the analysis unit, the identifier insertion unit causes the memory to store specific data contained in the page description language of the print instruction and replaces the specific data that has been stored with an identifier associated with the specific data so as to insert the identifier.

6. An image forming system comprising:
a processor;
a memory configured to store instructions for execution by the processor;
a plurality of drawing processing units that perform a drawing process on a print instruction written in a page description language;
a sending unit that sends the entirety of a print instruction including a plurality of pages, to the plurality of drawing processing units;
a delivering unit that delivers each of processing requests to a corresponding one of the plurality of drawing processing units, each of the processing requests specifying which page of the print instruction is to be subjected to a drawing process; and
an output unit that outputs an image on the basis of print data obtained as a result of the plurality of drawing processing units performing drawing processes,
wherein when each of the plurality of drawing processing units performs, in order to perform a drawing process in which a print instruction for a page specified by a processing request delivered by the delivering unit is converted into print data, an analysis process on the print instruction from the first page of the print instruction to the specified page, the drawing processing unit refers to an identifier in the page description language of the print instruction for pages other than the page specified by the processing request delivered by the delivering unit, and does not perform the analysis process for a range not containing a command that influences a drawing process of other pages.

7. A non-transitory computer readable medium storing a program causing a computer to execute a process, the process comprising:
sending the entirety of a print instruction including a plurality of pages, to a plurality of drawing processing units that performs a drawing process on a print instruction written in a page description language;
delivering each of processing requests to a corresponding one of the plurality of drawing processing units, each of the processing requests specifying which page of the print instruction is to be subjected to a drawing process;

when each of the plurality of drawing processing units performs, in order to perform a drawing process in which a print instruction for a page specified by a delivered processing request is converted into print data, an analysis process on the print instruction from the first page of the print instruction to the specified page, referring to an identifier in the page description language of the print instruction for pages other than the page specified by the delivered processing request, and not performing the analysis process for a range not containing a command that influences a drawing process of other pages; and outputting an image on the basis of the print data obtained as a result of the plurality of drawing processing units performing the drawing processes.

* * * * *